(12) United States Patent
Swales et al.

(10) Patent No.: US 8,169,110 B2
(45) Date of Patent: May 1, 2012

(54) OIL COOLED MOTOR/GENERATOR FOR AN AUTOMOTIVE POWERTRAIN

(75) Inventors: Shawn H. Swales, Canton, MI (US); Paul F. Turnbull, Canton, MI (US); Brian Schulze, Ortonville, MI (US); Fredrick R. Poskie, Plymouth, MI (US); William J. Omell, Washington Township, MI (US); William C. Deneszczuk, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 12/576,477

(22) Filed: Oct. 9, 2009

(65) Prior Publication Data

US 2011/0084561 A1    Apr. 14, 2011

(51) Int. Cl.
*H02K 9/19* (2006.01)
(52) U.S. Cl. .............. 310/54; 310/58; 310/60 A; 310/89
(58) Field of Classification Search .......... 310/52–60 A, 310/68 B, 89; 180/65.1, 65.21, 65.26, 65.6; 184/6.12
See application file for complete search history.

(56) References Cited

U.S. PATENT DOCUMENTS

| 3,648,085 | A | * | 3/1972 | Fujii | 310/54 |
|---|---|---|---|---|---|
| 4,418,777 | A | * | 12/1983 | Stockton | 180/65.6 |
| 4,953,663 | A | * | 9/1990 | Sugden | 184/6.12 |
| 5,605,045 | A | * | 2/1997 | Halimi et al. | 60/607 |
| 6,201,365 | B1 | * | 3/2001 | Hara et al. | 318/558 |
| 7,002,267 | B2 | | 2/2006 | Raszkowski et al. | |
| 7,239,055 | B2 | | 7/2007 | Burgman et al. | |
| 7,307,363 | B2 | | 12/2007 | Pashnik et al. | |
| 7,456,536 | B2 | * | 11/2008 | Tanaka et al. | 310/90 |
| 7,834,500 | B2 | * | 11/2010 | Savant | 310/78 |
| 2004/0080222 | A1 | | 4/2004 | Edrington | |
| 2005/0151429 | A1 | * | 7/2005 | Taketsuna et al. | 310/54 |
| 2009/0289583 | A1 | * | 11/2009 | Yoshida | 318/400.01 |
| 2010/0084206 | A1 | * | 4/2010 | Yoshida et al. | 180/65.1 |

* cited by examiner

*Primary Examiner* — Tran Nguyen
(74) *Attorney, Agent, or Firm* — Quinn Law Group, PLLC (57) ABSTRACT

An oil-cooled motor/generator for an automotive powertrain located outside of the transmission is provided, such as a BAS motor/generator. The motor/generator may have a stator, a rotor circumscribed by the stator, and a motor shaft on which the rotor is mounted for rotation. A housing assembly may surround the stator and the rotor, with a bearing positioned between the housing assembly and the motor shaft. A flow control member may at least partially circumscribe the rotor axially adjacent the stator. A bearing retainer may be positioned axially adjacent the bearing. A rotor end ring may be axially adjacent the rotor. The housing assembly may have an inlet configured to receive cooling oil. The housing assembly, the flow control member, the bearing retainer and the rotor end ring may be configured to distribute the cooling oil from the inlet to cool the stator, the rotor and the bearing.

18 Claims, 8 Drawing Sheets

OIL COOLED MOTOR/GENERATOR FOR AN AUTOMOTIVE POWERTRAIN

TECHNICAL FIELD

The invention relates to an automotive powertrain with an oil-cooled motor/generator located outside of the transmission housing.

BACKGROUND OF THE INVENTION

A belt-alternator-starter (BAS) type hybrid electric vehicle utilizes a motor/generator drivingly connected to an engine crankshaft, typically via a serpentine belt, similar to a traditional alternator. The motor/generator is used to restart the engine when exiting an autostop.

Alternators are typically water cooled or air cooled. Water cooling, typically using a water-ethylene glycol mixture, requires a water jacket surrounding the stator to keep the liquid out of direct contact with the electrical components of the stator. The water jacket adds to the packaging size of the alternator. Furthermore, the water jacket prevents cooling of the rotor. The relatively high temperature of the rotor decreases motor performance, efficiency and durability. Air cooling leaves stator wires exposed to the roadway, risking damage. Oil cooling has been proposed for automotive systems having motor/generators located inside of a transmission casing. Some jets have oil cooled engines from which cooling oil is routed to bearings located on turbines outside of the engine casing.

SUMMARY OF THE INVENTION

An automotive powertrain is provided with a motor/generator cooled by cooling oil and located outside of the transmission casing. The powertrain may be a hybrid powertrain, such as a BAS type hybrid powertrain, with the motor/generator being used for autostarts of the engine. A motor/generator is positioned outside of the transmission casing. The motor/generator may be configured to receive cooling oil to cool the motor/generator. Preferably, the motor/generator has features, such as a flow control feature, a flow control dam, and a bearing retainer feature, as well as a housing assembly that is configured to provide cooling oil to cool the stator, the rotor, and one or more bearings, preferably with oil provided through a single inlet in the housing assembly to the motor/generator.

The motor/generator may be in a cooling circuit with the transmission such that the cooling oil is provided from the transmission to the motor/generator (i.e., the same cooling oil used to cool transmission components cools the motor/generator). Alternatively, the motor/generator may be provided with cooling oil in a separate cooling circuit not shared with the transmission. A power inverter module operatively connected with the motor/generator for providing electrical power to the stator may be cooled within the same cooling circuit as the motor/generator, or may have a dedicated cooling circuit using oil, water-ethylene glycol, or air cooling.

In one embodiment, only a single oil feed is provided from the transmission to the motor/generator to deliver oil to cool the stator, the rotor and preferably bearings within the motor/generator. A flow control member, which may be a partial or complete ring, is cooperatively configured with the motor/housing to distribute the oil at desired flow rates to the stator and the rotor. A dam member may be connected or integrally formed with a rotor end ring to distribute the cooling oil circumferentially to the stator when the cooling oil is thrown outward toward the stator by centrifugal force. A feature may be provided on a bearing retainer to deliver some of the oil flowing from the flow control member to the bearing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
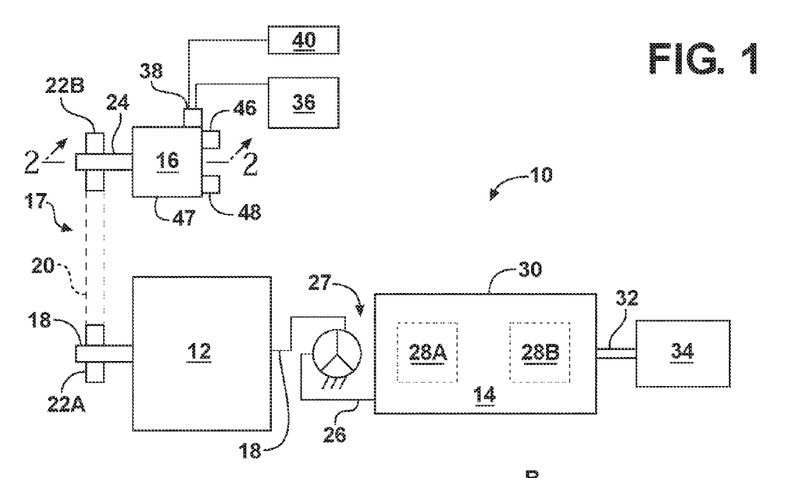
FIG. 1 is a schematic illustration of a hybrid powertrain with an engine, a transmission and a motor/generator cooled by oil from the transmission.

Referring to the drawings, wherein like reference numbers refer to like components throughout the several views, FIG. 1 shows a hybrid powertrain 10 with an engine 12, a transmission 14, and an electric motor/generator 16 operatively connected to an engine output member 18, such as a crankshaft, via a belt 20 and pulleys 22A, 22B, such that the output member 18 can drive a motor shaft 24 of the motor/generator 16 to store energy in a battery 36 operatively connected to the motor/generator 16, and the motor/generator 16 can transfer driving power to the engine 12, such as to restart the engine 12 from an autostop and provide boost as needed. In some operating circumstances, driving power from the engine 12 is not required, and the engine 12 is stopped to improve fuel economy. The motor/generator 16 is used to restart the engine 12 when driving power is required. A hybrid having such a connection between the engine 12 and the motor/generator 16 is referred to as a BAS hybrid, with a belt-alternator-starter (BAS) system 17. Because the motor/generator 16 may be packaged in the same location as a typical alternator, existing vehicle architectures are relatively easily converted to BAS system hybrids. The powertrain 10 is one embodiment of a representative powertrain. However, the motor/generator 16 may be used as well in other automotive or other applications.

An input member 26 of the transmission 14 is operatively connectable to the engine 12. A torque converter 27 fluidly couples the engine output member 18 to the input member 26, as is well understood. Other connections between the output member 18 and the input member 26 are also possible, such as a clutch connection. The transmission 14 houses transmission components 28A, 28B, such as clutches, brakes and gears within a transmission casing 30. Driving power is delivered through the transmission components 28A, 28B to a transmission output member 32 that provides tractive power to vehicle wheels through a final drive 34.

Electrical power is provided to the motor/generator 16 from a battery 36 via a power inverter module 38 under the control of an electronic controller 40. Mechanical energy of the motor/generator 16, driven by the engine 12, may also be converted to electrical energy stored in the battery 36. The power inverter module 38 is shown mounted to the motor housing 47 only schematically in FIG. 1, and is shown in its actual position mounted to a cover plate enclosure 72 on the end portion 60 in FIG. 2. A position sensor 73 is adjacent the cover plate enclosure 72 on the motor shaft 24.

The transmission components 28A, 28B are cooled and lubricated by cooling oil within the transmission casing 30. Components of the motor/generator 16, described with respect to FIG. 2, also require cooling. As described with respect to FIGS. 5 to 10, the motor/generator 16 and transmission 14 may be cooled via a common cooling circuit, or the motor/generator 16 may have a dedicated cooling circuit, not in fluid communication with the transmission 14. Cooling oil is delivered to an inlet 46 in the housing assembly 47 of the motor/generator 16. After cooling the motor/generator 16, the cooling oil is returned to the transmission 14 from an outlet 48 of the motor/generator 16.

Figure 2:
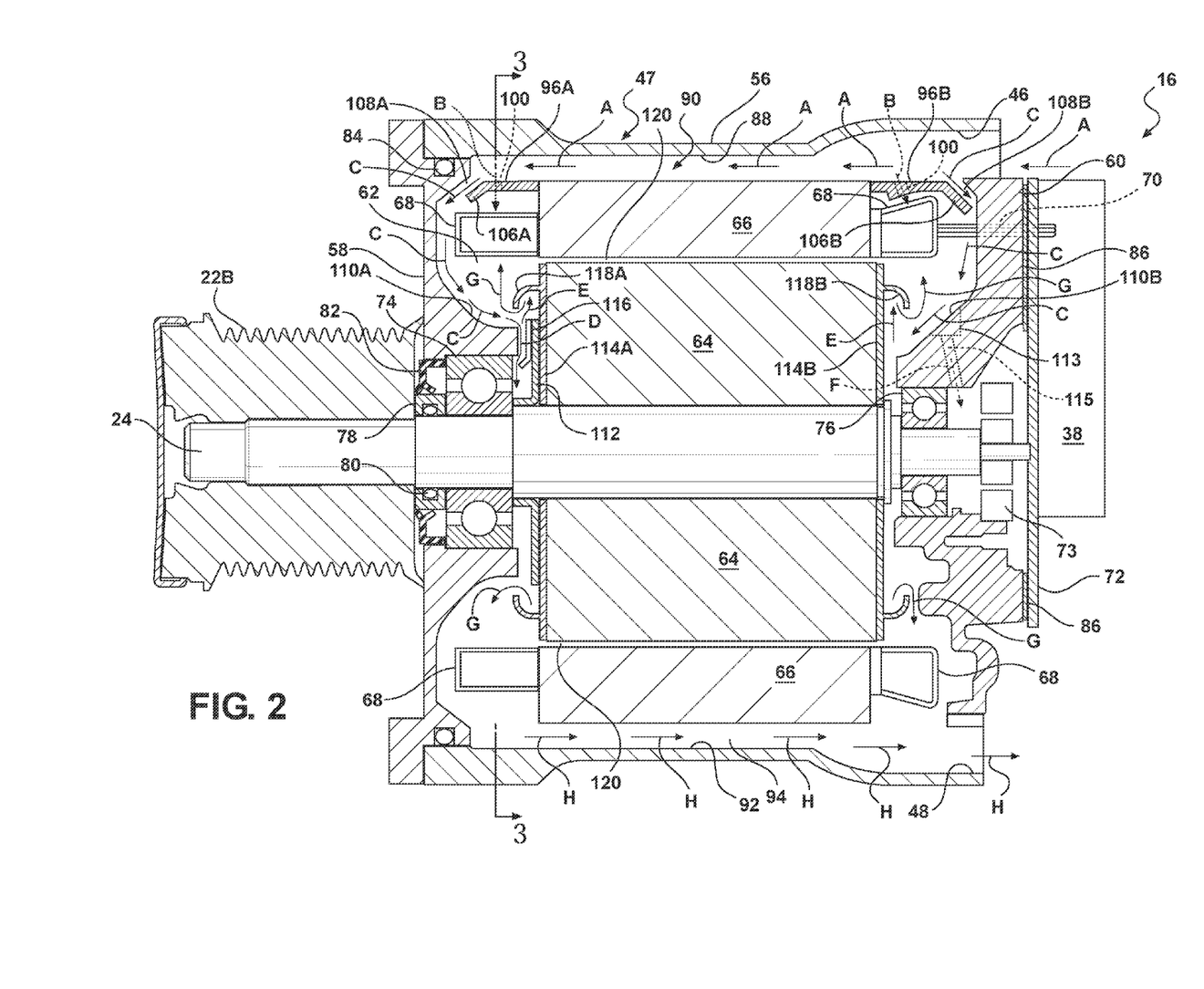
FIG. 2 is a schematic cross sectional illustration of the motor/generator of FIG. 1 taken at the lines 2-2 in FIG. 1.

Referring to FIG. 2, the motor/generator 16 is shown in more detail. The housing assembly 47 includes an annular stator housing 56 and a first end cover 58. A portion of the annular stator housing 56 is axially opposite the first end cover 58 and is referred to as end cover portion 60. The end cover portion 60 is preferably integrally cast with the stator housing 56. The end cover 58 and end cover portion 60 extend radially outward from the motor shaft 24 and define with the stator housing 56 an enclosed motor cavity 62.

The motor generator 16 includes a magnetic rotor 64 supported for rotation with the motor shaft 24, and a stator 66 circumscribing the rotor 64 and secured to the stator housing 56. End turns 68 of stator wiring extend from the stator 66 and create a magnetic flux when energized which urges rotation of the rotor 64, as is known. Three-phase wiring 70 is supplied to the stator 66 through the second end cover 60 and a cover plate enclosure 72 from the power inverter module 38.

A first bearing 74 and a second bearing 76 support the motor shaft 24 for rotation with respect to the housing assembly 47. A pulley stop ring 78 axially adjacent the bearing 74 is sealed to the motor shaft 24 with a first static seal 80. A lip seal 82, referred to as a dynamic seal as the pulley stop ring 78 rotates with the motor shaft 24, seals the first end cover 58 to a surface of the pulley stop ring 78. The seals 80, 82 prevent leakage of cooling oil past the pulley stop ring 78. A second static seal 84 seals the stator housing 56 to the first end cover 58. A third annular static seal 86 seals the end cover portion 60 to the cover plate enclosure 72.

The motor/generator 16 is configured such that cooling oil entering the housing assembly 47 through the single inlet 46 is distributed for direct cooling of the rotor 64, the stator 66 and the bearing 74 prior to exiting the motor/generator 16 through the single outlet 48. Direct oil cooling of these components results in lower operating temperatures, lower spin losses and higher motor efficiency.

Figure 3:
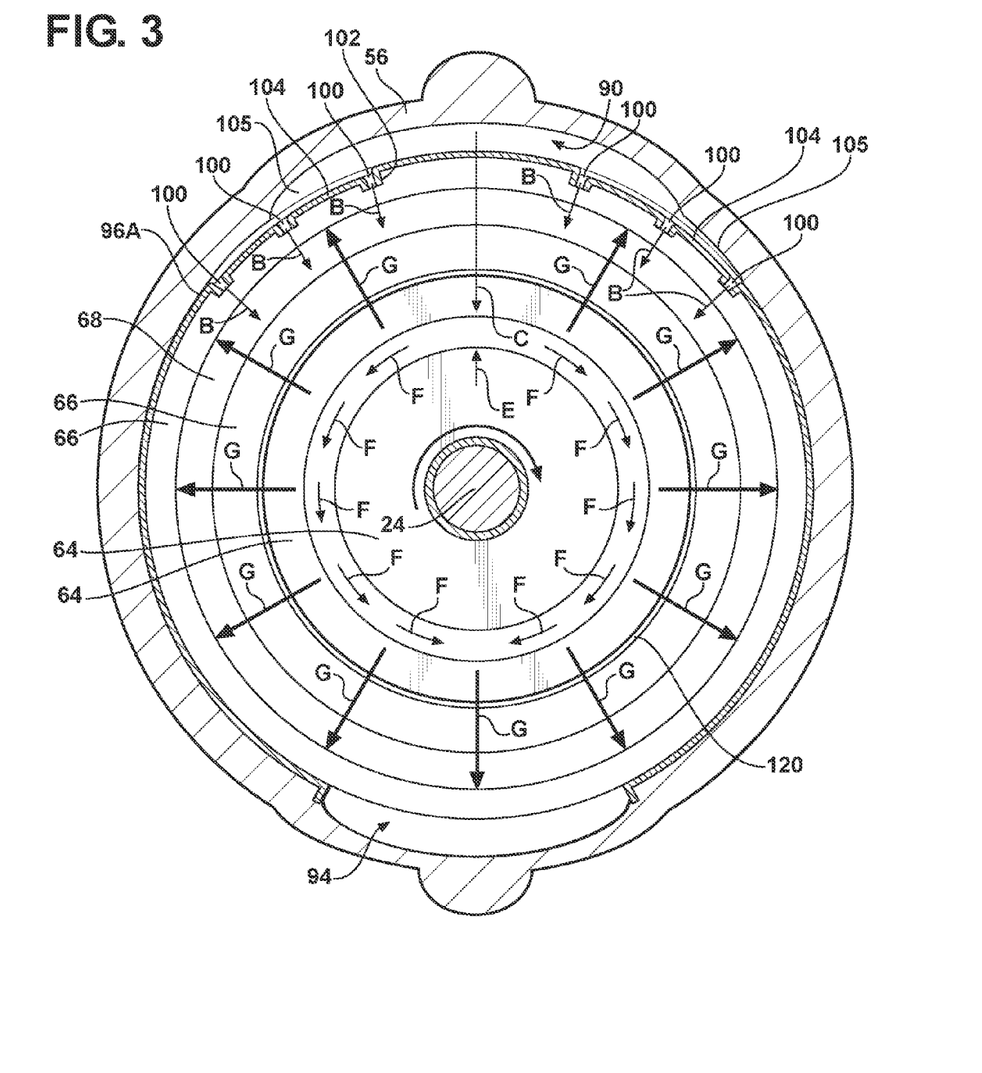
FIG. 3 is a schematic cross-sectional illustration of the motor/generator of FIGS. 1 and 2 taken at the lines 3-3 in FIG. 2.
Figure 4:
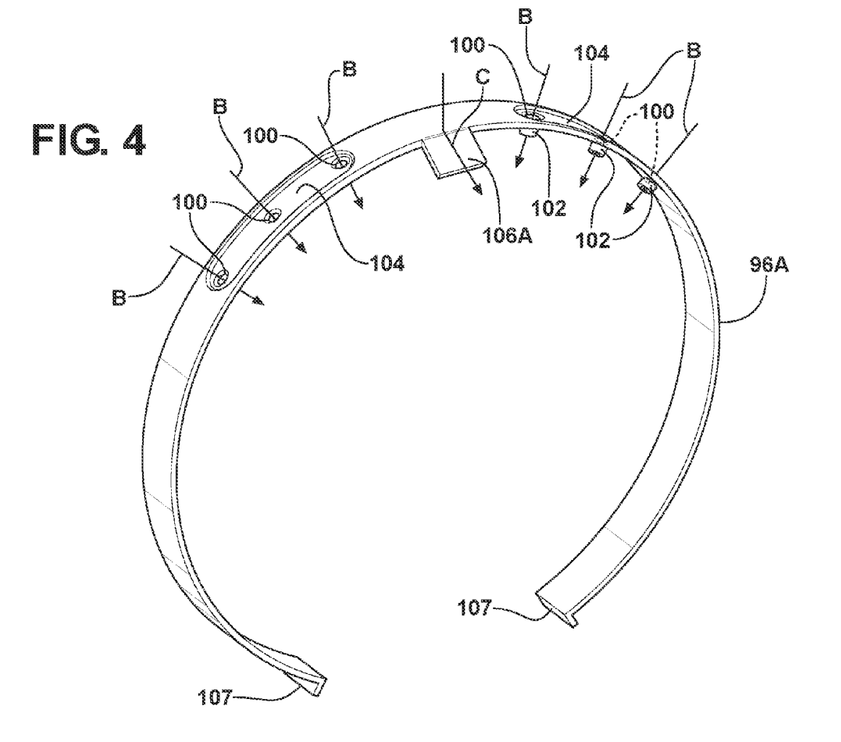
FIG. 4 is a schematic perspective illustration of a flow control member of the motor/generator of FIGS. 1-3 viewed looking along the motor shaft toward an end cover in FIG. 2.

Referring to FIGS. 2 and 3, the stator housing 56 has an axial extending recess 88 that forms a fluid supply gallery 90 between the stator housing 56 and the stator 66 and in fluid communication with the fluid inlet 46. Thus, fluid flows into the supply gallery 90 from the inlet 46 according to the flow path of arrows A. Another axial extending recess 92 is formed in the stator housing 56 substantially opposite the recess 88, forming a collection chamber 94 in fluid communication with the fluid outlet 48. Away from the supply gallery 90 and the collection chamber 94, the stator housing 56 is of a single wall thickness against the stator 66, creating a significantly smaller packaging size than a double wall and water jacket required of WEG-cooled motors.

First and second flow control members 96A, 96B are positioned axially adjacent either side of the stator 66. The flow control members 96A, 96B are arcuate, substantially ring shaped and preferably stamped members that are sprung against the inner diameter (i.e., inner surface) of the stator housing 56. Thus, the flow control members 96A, 96B clamp into place during motor/generator assembly, and provide oil routing as well as axial positioning of the stator 66. In some embodiments, the cooling oil is pressurized on the order of 10 kPa, and thus no seals are required around the flow control members 96A, 96B. Some leakage between the flow control members 96A, 96B and the stator housing 56 is acceptable. As shown in FIGS. 2 and 3, the flow control member 96A has ends adjacent the recess 92 such that the flow control member 96A is open at the collection chamber 94 to permit oil drainage into collection chamber 94. Flow control member 96B is similarly configured. In FIG. 3, the first end cover 58, bearing 74, bearing retainer 112, and dam member 118A are removed for purposes of illustration.

The flow control members 96A, 96B both have a plurality of circumferentially spaced openings 100 that are in fluid communication with the supply gallery 90. The openings 100 are sized to allow fluid to be directed out of the supply gallery 90 onto the end turns 68 of the stator 66 as indicated by the flow path of arrows B. The flow control members 96A, 96B are preferably pierced or otherwise form nipples 102 around the openings 100 to more accurately direct the flow B onto the end turns 68. The arc length of the supply gallery 90 is designed to appropriately distribute the fluid to the stator end turns 68. In one embodiment, there are six flow openings 100 in a 150 degree arc. In FIG. 3, an uppermost channel is created by a stamped or otherwise formed guide feature 106A, to guide oil to cool the rotor 64, as discussed below. If bolts connecting the stator 66 to the stator housing 56 or connecting the stator housing 56 to the end cover 58 require that the stator 66 must be spaced closer to satisfy noise, vibration and harshness concerns, thus limiting the supply gallery arc length, grooves 104 are stamped in portions of each of the flow control members 96A, 96B to define channels 105 between the stator housing 56 and the respective flow control member 96A, 96B, extending beyond the supply gallery 90, to reach the outermost holes 100, thus effectively extending the span of the flow onto the end turns 68. Preferably, some of the casting of the stator housing 56 is also relieved in this area. Alternatively, the flow control rings 96A, 96B could be recessed to a smaller radial position in these portions. The flow control rings 96A, 96B may have flanges 107 at the ends to help retain the ring shape during and after installation, to prevent the flow control rings 96A, 96B from shorting to the end turns 68.

Referring to FIG. 2, each of the flow control members 96A, 96B has a respective stamped guide feature 106A, 106B that may, but need not necessarily, extend axially beyond the openings 100 opposite the stator 66 and defines channels 108A, 108B in fluid communication with the supply gallery 90. Cooling oil flow is directed as indicated by arrows C through the channels 108A, 108B against respective inner surfaces 110A, 110B of the end cover 58, and end cover portion 60. The inner surfaces 110A, 110B are configured to taper radially and axially inward toward the rotor 64, so that most of the cooling oil flow C is directed onto the rotor 64.

A bearing retainer 112 is positioned between an end ring 114A of the rotor 64 and the bearing 74. The bearing retainer 112 includes a feature 116 that directs a portion of the flow C through a channel between the bearing retainer 112 and the end cover 58 onto the bearing 74 to cool the bearing, as indicate by flow arrow D. The feature 116 may be stamped into and therefore integrally formed with the bearing retainer 112, or may be a separate component secured to the bearing retainer 112. The end cover portion 60 has a cast or otherwise formed weir 113 to collect some of the cooling oil flow C and direct it through a drilled or otherwise formed passage 115 to lubricate bearing 76, as illustrated by cooling oil flow F. Oil cooled bearings potentially reduce spin losses verses greased and sealed bearings due to the lower viscosity of the cooling oil.

A portion of the flow C that hits either rotor end ring 114A, 114B is thrown radially outward by centrifugal force as represented by flow arrow E. The rotor end rings 114A, 114B each have a dam member 118A, 118B that may be a portion of the rotor end ring 114A, 114B, integrally formed therewith, as may be likely in the case of an induction motor (for which the end rings would not likely extend to the shaft 24), or may be a separate component secured thereto, as may be likely in the case of an interior permanent magnet motor. The dam members 118A, 118B extend axially outward and radially inward from the rotor end rings 114A, 114B, creating a dam that temporarily traps and distributes the cooling oil flow E circumferentially around the rotor end rings 114A, 114B, as indicated by flow arrows F in FIG. 3, before centrifugal force causes the cooling oil to spill outward from the dam members 118A, 118B, as indicated by flow arrows G in FIGS. 2 and 3, thus providing evenly distributed cooling at the inner diameter of the end turns 68. Additionally, the dam members 118A, 118B displace the cooling oil axially from the rotor end rings 114A, 114B, as indicated by arrows G, thus substantially preventing cooling oil from entering an air gap 120 between the stator 66 and rotor 64, decreasing spin losses.

After cooling the rotor 64, the bearings 74, 76 and the end turns 68 of the stator, gravity causes the cooling oil to pool in the collection chamber 94, even filling above the chamber 94 to cover a portion of end turns 68 and sides of the stator 66, before flowing through outlet 48, as indicated by flow arrows H. The cooling oil pressure and flow rate is controlled by designing the sizes of the inlet 46 and outlet 48 as well as the openings 100, supply gallery 90 and chamber 94 so that the oil sufficiently cools the rotor 64, stator 66, and bearing 74, and does not pool from the collection chamber 94 up to the rotor 64, which would increase spin losses.

Figure 5:
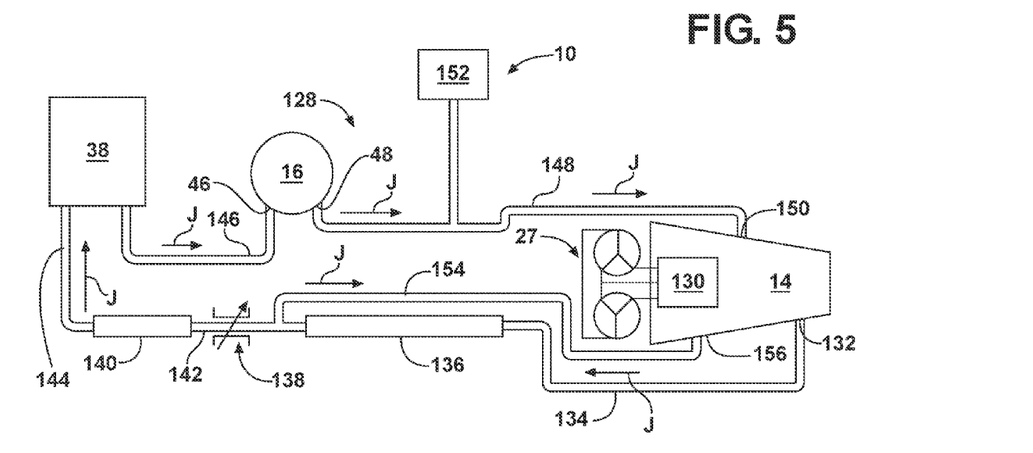
FIG. 5 is a schematic illustration of a first embodiment of a cooling circuit for the motor/generator, power inverter module, and transmission of the powertrain of FIG. 1.

Referring to FIG. 5, in one embodiment of a cooling circuit 128 for a portion of the powertrain 10, the motor/generator 16 is cooled using transmission cooling oil provided from the transmission 14. The transmission cooling oil is also used to cool the power inverter module 38. The direction of fluid flow is indicated by arrows J. The torque converter 27 drives a mechanical oil pump 130, which may be located on the transmission input member 26 of FIG. 1. Fluid is pumped from a sump in the transmission 14 from a transmission outlet 132 through cooling passage 134 to a transmission cooler 136. A valve 138 controls flow from the transmission cooler 136 to a second dedicated cooler 140 for the power electronic module 38 and motor/generator 16. The valve 138 may have a fixed or variable orifice controlled by the level of fluid in the motor/generator 16, by oil temperature, or by electronic means in response to one of these or another variable. When the valve 138 is opened, cooling oil flows through passage 142 from cooler 136, to cooler 140, through passage 144 to power inverter module 38, through passage 146 to inlet 46 of motor/generator 16, and then from outlet 48 of motor/generator 16 through a motor/generator return passage 148, also referred to as a gravity drain line, to transmission inlet 150. A surge tank 152 may be positioned in communication with the motor/generator return passage 148 to prevent pressure buildup in the passage 148. If the motor/generator return passage 148 is of a sufficiently large internal diameter, the surge tank 152 may not be necessary.

A separate cooler return passage 154 is provided from the transmission cooler 136 to a transmission inlet 156 to handle the higher pressure cooling oil returning to the transmission 14. The cooling circuit 128 requires no separate coolant pump to cool the power inverter module 38 and motor/generator 16, does not have a separate circuit for cooling these elements, and so avoids separate filling requirements. Additionally, the cooling oil to the power inverter module 38 and motor/generator 16 may be heated more quickly due to the transmission 14, although no cooling is available until the valve 138 opens. Because the cooling oil originates in the sump of the transmission 14, filtering may be used upstream of the motor/generator 16.

Figure 6:
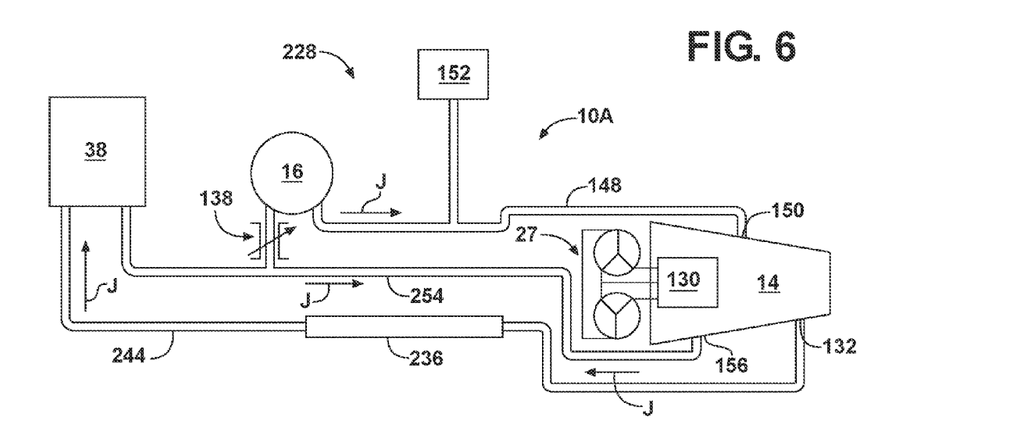
FIG. 6 is a schematic illustration of a second embodiment of a cooling circuit for the motor/generator, power inverter module, and transmission of the powertrain of FIG. 1.

FIG. 6 shows a powertrain 10A alike in all aspects to powertrain 10 except having a different cooling circuit 228. A transmission cooler 236 is of a capacity sufficient to reduce outlet temperature (i.e., temperature of cooling oil in passage 244) so that no separate dedicated cooler for the power inverter module 38 is necessary. The valve 138 is moved downstream of the power inverter module 38 with a return passage 254 from the power inverter module 38 to the transmission 14 serving as the cooler return passage.

Figure 7:
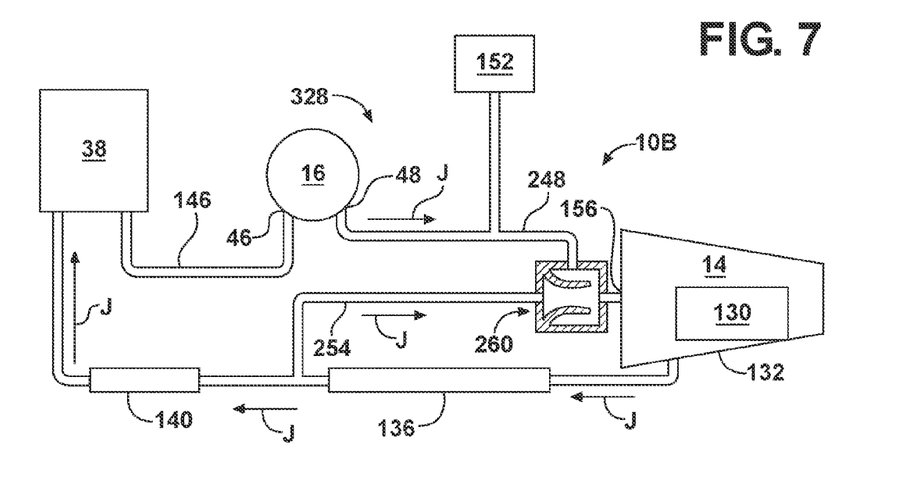
FIG. 7 is a schematic illustration of a third embodiment of a cooling circuit for the motor/generator, power inverter module, and transmission of the powertrain of FIG. 1.

FIG. 7 shows a powertrain 10B alike in all aspects to powertrain 10 except having a different cooling circuit 328. A jet pump 260 positioned in the cooler return passage 254 draws fluid from the motor/generator return passage 248, allowing a single return and inlet 156 in the transmission 14, and aiding in the gravity draining of return passage 248. The components of the circuit 328 should be sized to prevent the motor/generator return passage 248 from running dry and causing aeration through the jet pump 260.

Figure 8:
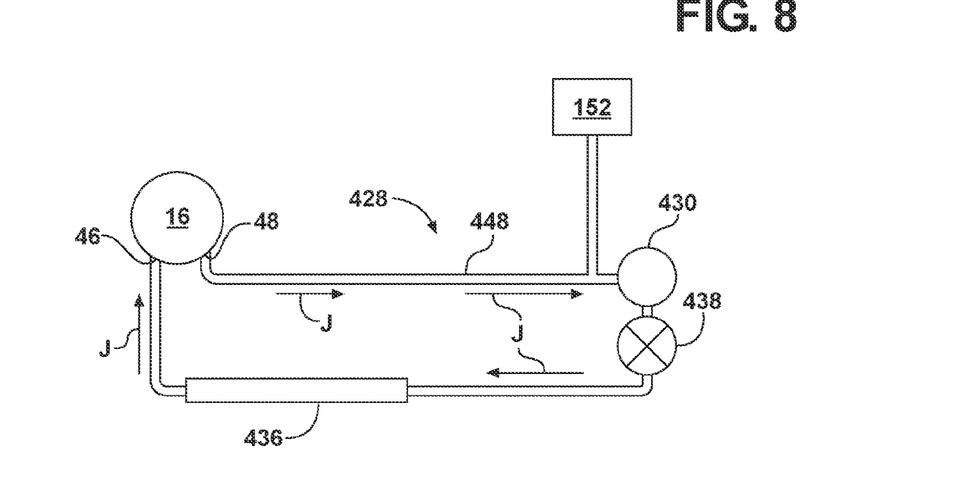
FIG. 8 is a fourth embodiment of a cooling circuit for the motor/generator and power inverter module of the powertrain of FIG. 1, separate from the transmission.
Figure 9:
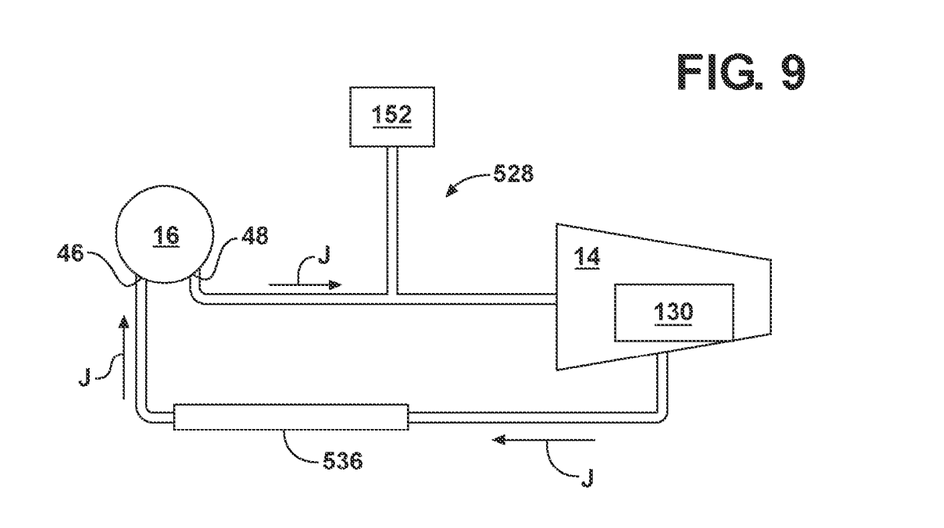
FIG. 9 is a fifth embodiment of a cooling circuit for the motor/generator and transmission of the powertrain of FIG. 1, separate from the power inverter module.
Figure 10:
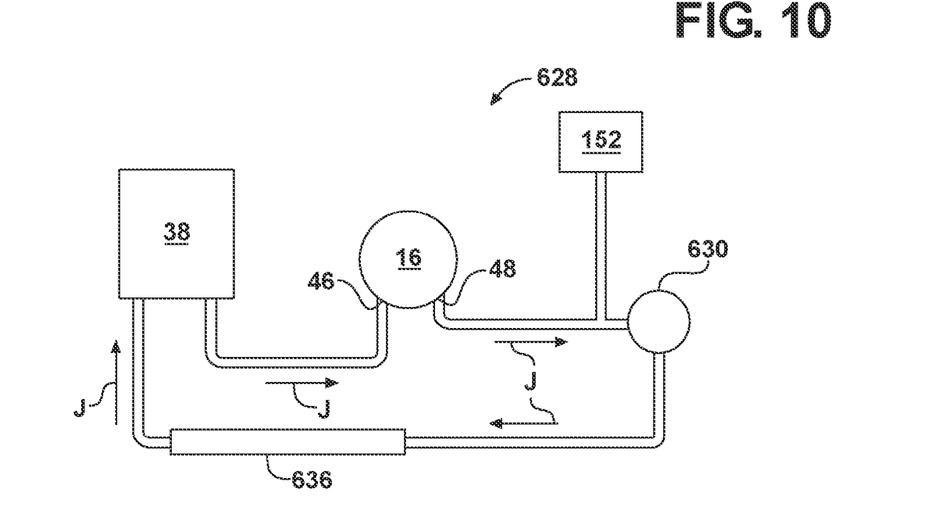
FIG. 10 is a sixth embodiment of a cooling circuit for the motor/generator and power inverter module of the powertrain of FIG. 1, separate from cooling of the transmission.

FIGS. 8, 9 and 10 show three different cooling circuit options for the oil cooled motor/generator 16. In FIG. 8, the motor/generator 16 is cooled in an oil cooling circuit 428 pressurized by a pump 430, with fluid flow controlled by a thermostat valve 438 through cooler 436, and with an optional surge tank 152 in the motor/generator return passage 448. The power inverter module 38 of powertrain 10 is not cooled by the cooling circuit 428, but requires a separate cooling circuit, which may be oil cooled, air cooled, or water-ethylene glycol cooled. Furthermore, the cooling circuit 428 is separate from a cooling circuit for the transmission 14, and the cooling oil for the motor/generator 16 is not provided from the transmission 14. The separate cooling circuit 428 has a lower operating temperature than if combined with the power inverter module 38, allowing a smaller cooler 436. Thus, the thermostat valve 438 controls flow through the cooler 436 to prevent undesirable high viscosity and flow resistance associated with low coolant temperatures. A cooling circuit for the power inverter module 38 will have less load than if combined with the motor/generator cooling circuit 428, and can be sized for the power inverter module 38 alone.

Referring to FIG. 9, in cooling circuit 528, the motor/generator 16 is cooled by cooling oil provided from the transmission 14 and pressurized by the transmission pump 130, using the transmission cooler 536. A separate cooling circuit is provided for the power inverter module 38 (not shown), which may be oil cooled, air cooled or water-ethylene glycol cooled. Combining the transmission cooling circuit with the motor/generator cooling circuit reduces overall cooling system costs. However, higher temperature of the cooling oil from the transmission sump may reduce the effectiveness of cooling the motor/generator 16 in comparison to a dedicated cooling circuit. Filtering may be required to prevent contaminants from the sump from reaching the motor/generator 16.

Referring to FIG. 10, a cooling circuit 628 is shown in which cooling oil is provided to both the power inverter module 38 and the motor/generator 16 using a pump 630 and cooler 636 separate from a transmission cooling circuit. The pump 630, and surge tank 152 (if needed) may be integrated into the cooler 636. Combining cooling of the power inverter module 38 and the motor/generator 16 in a single circuit may reduce costs, but may be offset by potentially requiring the power inverter module 38 to be resized as oil cooling in the combined circuit 628 may have less heat removal capability than a dedicated water-ethylene glycol or air cooled circuit for the power inverter module 38.

Figure 11:
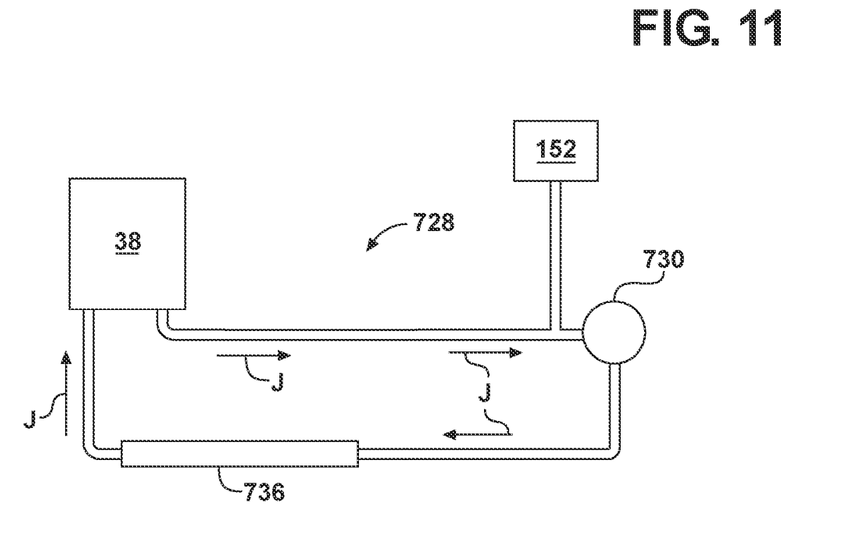
FIG. 11 is an embodiment of a dedicated cooling circuit for the power inverter module of FIG. 1, using oil cooling and separate from cooling of the motor/generator and the transmission.
Figure 12:
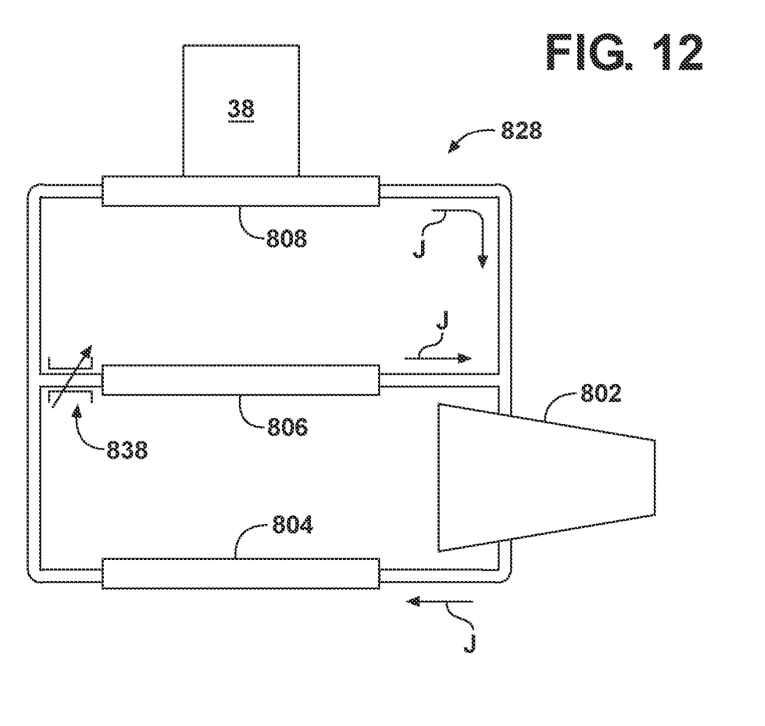
FIG. 12 is another embodiment of a dedicated cooling circuit for the power inverter module of FIG. 1, using water-ethylene glycol cooling and separate from cooling of the motor/generator.
Figure 13:
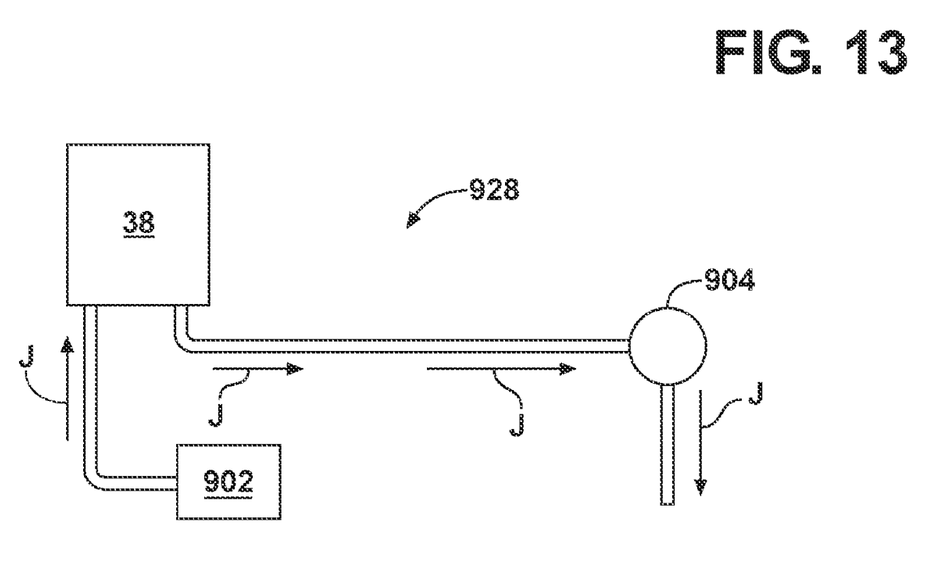
FIG. 13 is a still another embodiment of a dedicated cooling circuit for the power inverter module of FIG. 1, using air cooling and separate from cooling of the motor/generator and the transmission.

FIGS. 11-13 show different configurations for cooling the power inverter module 38 in a separate cooling circuit for the motor/generator 16. In FIG. 11, in cooling circuit 728, the power inverter module 38 is cooled with water-ethylene glycol with a dedicated cooler 736, pump 730 and optional surge tank 152. In FIG. 12, the power inverter module 38 is cooled with a two-phase cooling circuit 828 using a vehicle heating ventilation and air conditioning (HVAC) compressor, condenser 804 and evaporator 806 with a dedicated evaporator 808 for the power inverter module. Flow control between the evaporators 806, 808 is controlled by a valve 838 that may be responsive to temperature of the power inverter module 38. Fluid in circuit 828 is drawn from a sump of transmission 802.

Referring to FIG. 13, a cooling circuit for the power inverter module 38 relies on air cooling with flow through an air filter 902 to the power inverter module 38. A fan 904 pulls air through the circuit 928.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
 a transmission having a transmission casing; and
 a motor positioned outside of the transmission casing;
 wherein the motor is configured to receive cooling oil to cool the motor/generator;
 wherein the motor has a stator, a rotor, and a housing assembly surrounding the stator and the rotor; wherein the housing assembly has an inlet configured to receive the cooling oil for distribution to the stator and the rotor;
 wherein the housing assembly has a stator housing to which the stator is mounted and has an axially-extending recess partially defining a supply gallery in fluid communication with the inlet, between the housing assembly and the stator, and through which the cooling oil is distributed to the stator and the rotor;
 wherein the motor has a flow control member at least partially circumscribing the rotor and axially adjacent the stator at the recess; and wherein the flow control member has circumferentially-spaced openings to distribute the cooling oil from the supply gallery to the stator.

2. The powertrain of claim 1, further comprising:
 an engine having a crankshaft;
 wherein the motor is operatively connected with the crankshaft for providing power thereto.

3. The powertrain of claim 1, wherein the motor has a motor shaft and a bearing positioned between the housing assembly and the motor shaft; and wherein the cooling oil from the inlet is further distributed to the bearing.

4. The powertrain of claim 1, wherein the recess is a first recess; wherein the housing assembly has a second recess spaced generally opposite the first recess to collect the cooling oil, and has an outlet in fluid communication with the second recess for expelling the cooling oil from the motor.

5. The powertrain of claim 1, wherein the housing assembly includes a generally radially-extending first end cover secured to the stator housing;
 and wherein the flow control member partially defines with the first end cover a channel between the first end cover and the flow control member through which the cooling oil is directed radially inward along an inner surface of the first end cover to the rotor.

6. The powertrain of claim 5, wherein the motor has:
 a bearing retainer axially adjacent the bearing and configured to redirect a portion of the cooling oil flowing along the inner surface of the first end cover to the bearing.

7. The powertrain of claim 5, wherein the first end cover tapers axially toward the rotor, and wherein the motor has:
 a rotor end ring axially adjacent the rotor and connected for rotation therewith; and
 a dam member connected with the rotor end ring and extending toward the first end cover and tapering radially inward to form a dam radially outward of the first end cover to catch cooling oil thrown radially outward by centrifugal force and to distribute the oil at least partially circumferentially around the dam member prior to the cooling oil being thrown radially outward from the dam member to the stator.

8. The powertrain of claim 3, wherein the motor has a motor shaft on which the rotor is mounted for rotation; and further comprising:
 a pulley mounted for rotation with the motor shaft and operatively connected with the crankshaft;
 a pulley stop ring positioned on the motor shaft between the pulley and the bearing;
 a first seal sealing the pulley stop ring to the motor shaft; and
 a second seal sealing the first end cover to the pulley stop ring.

9. The powertrain of claim 8, wherein the stator housing has an end portion axially opposite the first end cover and extending radially between the motor shaft and the stator, and further comprising:
- a third seal sealing the first end cover to the stator housing;
- an enclosure through which electrical wire is provided to the stator; and
- a fourth seal sealing the enclosure to the end portion of the stator housing.

10. The powertrain of claim 1, wherein the motor receives cooling oil from the transmission.

11. The powertrain of claim 10, further comprising a valve to control cooling oil flow from the transmission to the motor.

12. The powertrain of claim 10, further comprising:
- a power inverter module operatively connected to the motor for providing electrical power thereto; wherein the power inverter module is cooled by cooling oil from the transmission upstream of the motor, the power inverter module and the motor thereby being in one cooling circuit.

13. A powertrain comprising:
- a transmission having a transmission casing;
- a motor positioned outside of the transmission casing; wherein the motor is configured to receive cooling oil to cool the motor; wherein the motor receives cooling oil from the transmission;
- a power inverter module operatively connected to the motor for providing electrical power thereto; wherein the power inverter module is cooled by cooling oil from the transmission upstream of the motor, the power inverter module and the motor thereby being in one cooling circuit;
- a first cooler to cool the cooling oil flowing from the transmission; and
- a second cooler positioned downstream of the first cooler to further cool cooling oil flowing from the first cooler to the power inverter module.

14. The powertrain of claim 12, further comprising:
- a cooler to cool cooling oil flowing from the transmission;
- a cooler return passage from which cooling oil cooled by the cooler returns to the transmission without flowing through the motor.

15. The powertrain of claim 14, further comprising:
- a motor return passage from which cooling oil flows from the motor to the transmission;
- a jet pump positioned in the cooler return passage and in fluid communication with the motor return passage to draw fluid from the motor return passage; and
- a transmission return passage connected to the transmission into which both the motor return passage and the cooler return passage feed through the jet pump.

16. The powertrain of claim 1, further comprising:
- a power inverter module operatively connected to the motor for providing electrical power thereto; wherein the power inverter module is cooled by cooling oil in one cooling circuit with the motor.

17. The powertrain of claim 1, further comprising:
- a power inverter module operatively connected to the motor for providing electrical power thereto; wherein the power inverter module is cooled by one of air cooling, oil cooling and water ethylene glycol cooling in a cooling circuit; and wherein the motor is not cooled by said one of air cooling, oil cooling and water ethylene glycol cooling in the cooling circuit.

18. A motor/generator comprising:
- a stator;
- a rotor circumscribed by the stator;
- a motor shaft on which the rotor is mounted for rotation;
- a housing assembly surrounding the stator and the rotor;
- a bearing positioned between the housing assembly and the motor shaft;
- a flow control member at least partially circumscribing the rotor and axially adjacent the stator;
- a bearing retainer axially adjacent the bearing;
- a rotor end ring axially adjacent the rotor and connected for rotation therewith;
- wherein the housing assembly has an inlet configured to receive cooling oil; and
- wherein the housing assembly, the flow control member, the bearing retainer and the rotor end ring are configured to distribute the cooling oil from the inlet to cool the stator, the rotor and the bearing.

* * * * *